United States Patent [19]

Gehrke

[11] Patent Number: 4,813,808
[45] Date of Patent: Mar. 21, 1989

[54] AXIAL RETAINING MEMBER AND METHOD FOR INTERCONNECTING MALE AND FEMALE SPLINED MEMBERS

[75] Inventor: Glenn F. Gehrke, Brighton, Mich.

[73] Assignee: GKN Automotive Components Inc., Auburn Hills, Mich.

[21] Appl. No.: 4,806

[22] Filed: Jan. 9, 1987

Related U.S. Application Data

[63] Continuation of Ser. No. 808,169, Dec. 12, 1985, abandoned, which is a continuation-in-part of Ser. No. 524,750, Aug. 19, 1983, Pat. No. 4,756,640.

[51] Int. Cl.$^4$ .......................... F16B 21/18; F16D 3/76
[52] U.S. Cl. ..................... 403/326; 403/359; 403/371; 403/372; 403/377; 464/146; 464/906; 74/18.1; 24/625
[58] Field of Search .............. 403/359, 360, 376, 372, 403/377, 326, 371, 289, 361, 50, 51, 202, 223; 74/18.1, 18; 464/146, 145, 906; 24/625

[56] References Cited

U.S. PATENT DOCUMENTS

| | | |
|---|---|---|
| 2,510,362 | 6/1950 | Anderson .......................... 74/18.1 |
| 3,017,756 | 1/1962 | Sharp ................................ 464/146 |
| 3,039,716 | 6/1962 | Visockis ....................... 403/289 X |
| 3,139,768 | 7/1964 | Biesecker ......................... 403/372 |
| 3,167,338 | 1/1965 | Troike .............................. 403/359 |
| 3,195,360 | 7/1965 | Burnett ............................. 403/50 |
| 3,354,302 | 11/1967 | Greasley ..................... 403/289 X |
| 3,430,993 | 3/1969 | Leshinsky ........................ 403/359 |
| 3,782,840 | 1/1974 | Brishka ............................ 403/361 |
| 3,822,790 | 7/1974 | Armour et al. ................. 403/371 |
| 4,081,218 | 3/1978 | Gabriel ............................. 403/359 |
| 4,407,517 | 10/1983 | Neyer ............................... 74/18.1 |
| 4,447,066 | 5/1984 | Katagiri et al. .................. 74/18.1 |

FOREIGN PATENT DOCUMENTS 2627397 12/1977 Fed. Rep. of Germany .

Primary Examiner—Randolph A. Reese
Assistant Examiner—Peter M. Cuomo
Attorney, Agent, or Firm—Remy J. VanOphem

[57] ABSTRACT

A method of retaining a splined male member and a splined female member against relative axial motion therebetween when the splines of the members are in engagement with one another and a unitary axial retaining member for use in the practice of the method. The method includes the steps of mounting a hollow, thermoplastic axial retaining member to the interior surface of the female member and positively interconnecting the other end of the axial retaining member with the male member. The axial retaining member has an inwardly oriented flange for interconnecting one end of the retaining member to the male member and an outwardly oriented radial flange for interconnecting the opposite end of the retaining member to the female member. A plurality of longitudinal slots are optionally formed in one end of the retaining member to separate it into a plurality of flexible fingers to facilitate interconnection of that end of the retaining member with its associated male or female member. In one version of the axial retaining member, its radial thickness is substantially reduced along a longitudinal line that extends from the unslotted end thereof to one of the longitudinal slots, to facilitate the controlled separation of the axial retaining member along such longitudinal line when it is inserted over the male member, and in such version of the invention, some of the splines on the male member that engage the splines in the female member, are blocked to permit end loads on the joint using such members to be absorbed by the male and female members, without being imposed on the thermoplastic axial retaining member.

25 Claims, 4 Drawing Sheets

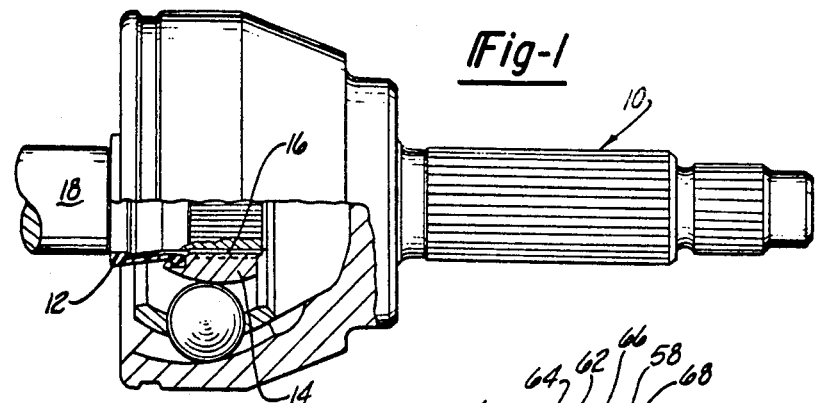
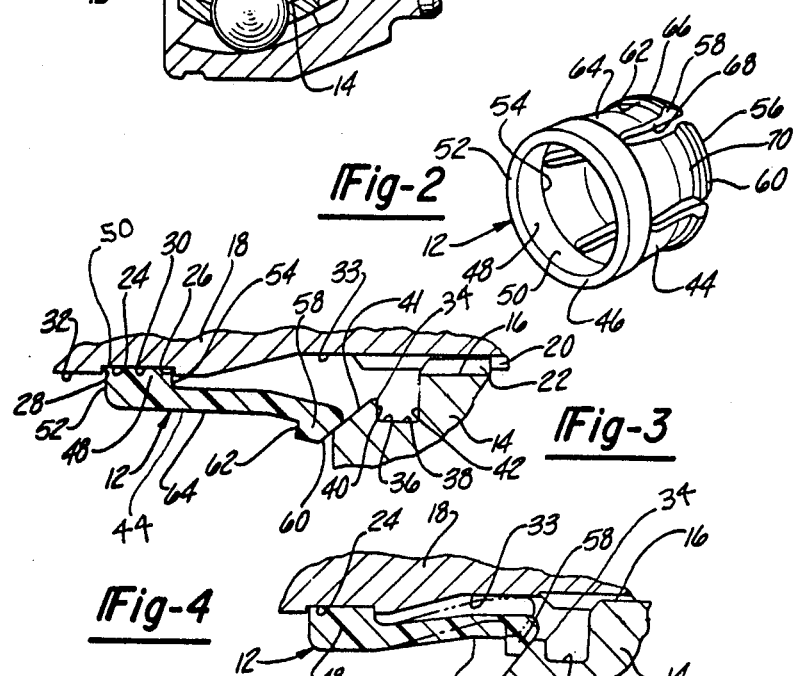
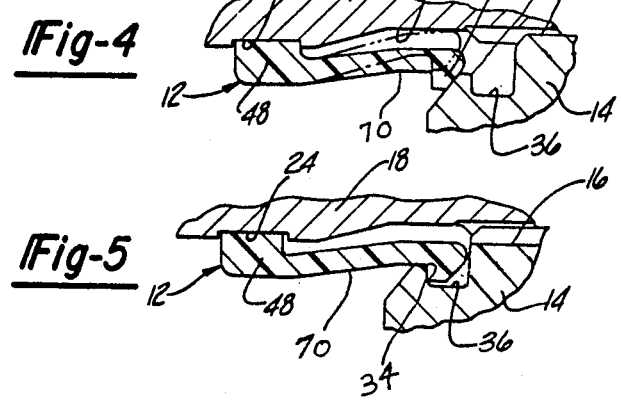
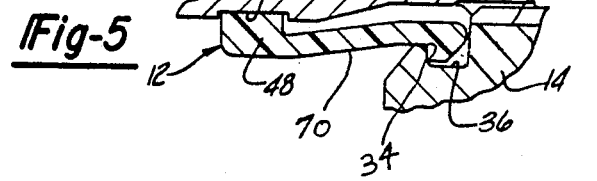

AXIAL RETAINING MEMBER AND METHOD FOR INTERCONNECTING MALE AND FEMALE SPLINED MEMBERS

CROSS REFERENCE TO RELATED APPLICATION

This application is a continuation of U.S. patent application Ser. No. 808,169, field on Dec. 12, 1985, now abandoned, which is a continuation-in-part of my co-pending U.S. patent application Ser. No. 524,750, filed on Aug. 19, 1983 now U.S. Pat. No. 4,756,640.

BACKGROUND OF THE INVENTION

The present invention relates to axial retaining members and, more particularly, to a unitary axial retaining member for interconnecting two components and preventing axial motion therebetween. The present invention is particularly useful for preventing relative axial motion between a female member, such as an inner race of a half-shaft assembly, and a shaft inserted in a bore in the female member.

There are many mechanical structures requiring the interconnection between a shaft and a female member having a bore for the shaft. Often, what is desired is a structure for preventing relative axial motion between the shaft and the female member. An example of a device requiring such a structure is a half-shaft assembly, used in the drive train of a front wheel drive automobile. Typically, a shaft is provided which is inserted in a bore in an inner race. Cooperating splines are provided between the shaft and the inner race to prevent relative rotation therebetween.

Typically, two or more fastening members are used for interconnecting the shaft and the inner race. A first fastening member may be a retaining ring disposed ahead of the splines on the shaft and forced by the splines into a retaining position below the minor diameter of the inner race splines. In this position, the retaining ring expands into a groove in the inner race and separation of the shaft from the inner race is prevented. However, a certain amount of movement of the shaft relative to the inner race is still possible.

A second retaining member consisting of a spacer ring may also be provided, the spacer ring being fitted in an annular bore on the shaft and abutting a portion of the inner race so as to prevent further movement of the shaft into the bore in the inner race. Thus, the spacer ring cooperates with the retaining ring to prevent movement of the shaft relative to the inner race in either direction.

A chamber angle is machined at the bottom of a counterbore of the above described bore and this chamfer angle acts in a wedge-like fashion, compressing the retaining ring inwardly and, thus, facilitating disassembly. This chamber angle must be carefully selected to avoid inadvertent disconnection of the assembly during use, yet to permit disassembly when required for service.

The use of two separate retaining elements, as described above, is expensive and inconvenient. Accordingly, what is needed is a unitary axial retaining member to replace the two or more retaining members previously used.

A prior design for a unitary retaining means is described in U.S. Pat. No. 3,832,076, to Glenn Gehrke. The retaining ring disclosed therein is used to interconnect a male and female splined member. The female member has an annular radially outwardly facing retaining groove that is located radially opposite an annular, radially outwardly facing retaining groove on the male member when the splined members are in the desired mating relationship. The splined members are retained together by a retaining ring of the snap ring type which is split and may be positioned such as to occupy both the retaining grooves when the grooves are radially aligned. The size of the retaining ring is determined so that the retaining ring is expanded against the bottom of the retaining groove and is in interference contact with the splines between their major and minor diameters. The retaining ring is urged by ramps on one end of the splines of one of the members into an assembly-disassembly position in an annular groove on the other member. Upon proper mating of the members, the retaining ring assumes a retention position in the grooves. However, one of the grooves is ramped on one side to provide disassembly by reversal of the assembly operation. Accordingly, the retaining ring described above does not positively connect the female splined member with the male splined member and, accordingly, inadvertent disassembly during use is possible under extreme conditions.

Various other designs have been developed in the past for interconnecting splined elements. For example, U.S. Pat. No. 3,527,120 to M. J. Duer, et al., teaches a differential and axle shaft retainer which includes a spring member retained on the axle shaft by tangs engaging a groove formed on the shaft. The body of the retainer is flexible outwardly for installation on the axle shaft and flexes inwardly so as to permit sliding the axle shaft through the differential case and side gear openings into its installed position. Upon installation, the retainer fingers spring outwardly into engagement with the abutting surfaces of the side gear so as to lock the axle shaft in position and prevent outward axial movement thereof.

Brown, U.S. Pat. No. 2,089,168, as well as Hawkins, U.S. Pat. No. 3,449,926, both teach a means for locking a nut or hub member to a shaft. In Brown, a hub having splines with one side parallel to the hub axis and another side tapered is mounted to a splined shaft with parallel splines utilizing an intermediate member having fingers which have been machined to cooperate between the splines of the hub and shaft member. The fingers on the intermediate member are parallel to the axis on one side and tapered on the other side so that when the hub and intermediate member are mounted to the shaft, a nut is tightened against the intermediate member such that the fingers engage the tapered sides of the hub splines and carry the hub along until it abuts against the spacer. Further tightening of the nut then accomplishes two results. First, the tapered fingers are wedged circumferentially in the tapered spaces between the hub splines and the shaft splines. Second, the axial pressure from the nut also forces the hub firmly against the spacer, thus, clamping the bearing race against the shoulder. This assembly provides a tight circumferential driving fit between the hub and the shaft.

In Hawkins, a turbine shaft is coupled to the shaft of a compressor drive utilizing a thrust nut which prevents any relative rotation of the thrust nut and the shaft to which it is threaded, and which is readily adjustable by a tool inserted through one shaft. A safety interlock is provided such that the tool cannot be removed after the nut has been adjusted unless it has been stopped at the position where the detent is effective. Accordingly, the coupling is an axially adjustable connection between coaxial shafts. In this coupling, the fingers serve to couple the nut to a locking device or lock ring. A plurality of wave springs and ring members are built up on the thrust nut which includes the part extending axially defined by fingers to nonrotatively lock the ring to a shaft. The snap ring groove extends around the rear end of the fingers to receive a snap ring and thereby lock the wave springs and ring members to the thrust nut.

Smith, U.S. Pat. No. 2,625,415, teaches a flexible splined connection for a pair of members in which one of the members is provided with a plurality of integral, independently flexible longitudinally extending keys or fingers which are expanded in such a manner as to ensure contact over the entire contact area of a mating spline passage. The longitudinally extending keys or fingers are manufactured by slotting or cutting the splined end of the shaft and expanded radially by applying pressure to the ring at the base portion of the recess so that the outer diameter of the circumferentially spaced keys is slightly larger than the diameter of the spline passage.

Upon assembly, the keys are individually flexed inwardly a slight amount and, when in position, each individual key contacts a portion of the adjacent keys and its mating keyway in the hub to thereby maintain even contact and constant pressure along the entire length and diameter of the passage. Prior to forming the splines on the shaft, an outer annular rings is machined on the shaft or such dimension as to fit within the recess. It is interesting to note for this particular application, the splined end of the shaft must protrude beyond the hub member in order to enable disassembly from the shaft. In fact, this was specifically set forth in column 3 of the Smith patent.

None of these prior designs, however, address the basic problem described above, that is, providing a simple, inexpensive, unitary retaining member for positively axially retaining a shaft to an inner race of a halfshaft assembly.

SUMMARY OF THE PRESENT INVENTION

The present invention provides a method and a member for positively retaining a male member and a female member, such as a shaft and an inner race for a half-shaft assembly, against relative axial movement and further provides a unitary axial retaining member using the method and a locking arrangement utilizing a shaft, a female member and an axial retaining member for retaining the shaft and the female member in proper position relative to one another.

The method of the present invention includes mounting at least one end of the hollow unitary axial retaining member to the exterior surface of the male member of the shaft, rotatably interconnecting the one end of the hollow unitary axial retaining member to the shaft, and rotatably interconnecting the female member with the opposite end of the hollow unitary axial retaining member. Preferably, both the interconnecting steps are accomplished by interconnecting a radial flange on the hollow unitary axial retaining member with a radial channel in the male member or the female member.

The axial retaining member of the present invention is a longitudinally extending member having a central passageway therethrough permitting the mounting of the axial retaining member on a male member or shaft. A first interconnection means, such as a radial flange, extends inwardly from the axial retaining member adjacent one end thereof and provides an interconnect in between the axial retaining member and the male member. A second interconnection means, such as an outwardly oriented radial flange, extends outwardly from the axial retaining member adjacent the opposite end thereof and provides an interconnection between the axial retaining member and a female member.

In certain embodiments of the present invention, a plurality of longitudinal slots are formed in the axial retaining member extending from at least one of the ends thereof towards the opposite end thereof so as to split that one end into a plurality of longitudinally extending flexible fingers. When the fingers are provided at the end of the axial retaining member associated with the female member, additional shorter fingers may be provided to abut the female member and provide a more positive interconnection therebetween. The fingers are preferably proportioned such as to be in a stressed condition when in use such as to positively lock the axial retaining member to one of the male or female members.

Also in certain embodiments of the present invention, the outwardly oriented flange preferably includes an annular shoulder forming an angle of no more than ninety degrees relative to the main body so as to positively retain the flange in an inwardly oriented annular channel in the female member. Furthermore, the second flange is preferably provided with at least a partly frustoconically shaped end cooperating with a frustoconically shaped surface of the female member so as to resiliently guide the flexible fingers to deflect inwardly towards the shaft to facilitate rapid interconnection between the axial retaining member and the female member.

In the preferred embodiment of the present invention the axial retaining member is of a substantially reduced thickness along a longitudinal line that extends partially from one of the ends thereof to the other. This reduced thickness permits a controlled separation of the axial retaining member when it is inserted over the male member of the male and female members that are being connected by the axial retaining member to permit the retaining member to be formed from a hard, dimensionally stable thermoplastic material that would otherwise be difficult to attach to such male member.

The primary object of the present invention is to provide an axial retaining member for retaining a female member and a male member against relative axial movement therebetween in an inexpensive, efficient, and positive manner. This object is accomplished by providing a unitary, axial retaining member fitted onto the male member and positively engaging the male member and the female member.

Another object of the present invention is to provide an inexpensive and reliable axial retaining member for positive interconnection of a splined male member with a splined female member. The reliability of the axial retaining member of the present invention is enhanced by the flexible fingers being prestressed in their locking position, such as to positively secure the splined male and female members together.

Still another object of the present invention is to provide a removable axial retaining member suitable for use in positively interconnecting a splined axle to an inner race of a half-shaft assembly.

Yet another aspect of the present invention is to provide a reliable axial retaining member which facilitates the rapid and reliable interconnection of a female member with a male member. The axial retaining member of the present invention facilitates this rapid interconnection by the use of cooperating frustoconical surfaces on the axial retaining member and the female member.

Yet another object of the present invention is to provide a reliable axial retaining member that can be formed from a thermoplastic material of sufficient hardness and dimensional stability to perform satisfactorily during its operating life and which can, nevertheless, be attached in a satisfactory manner to the male member of an assembly of a male member and a female member.

It is also an object of the present invention to provide a halfshaft assembly that includes a splined metal male member, a splined metal female member and a thermoplastic axial retaining member for positively interconnecting the splined metal male member and the splined metal female member in which end loads on the halfshaft assembly are sustained by contact between the male member and the female member, thereby insuring that the thermoplastic axial retaining member does not encounter end loads during service that could be destructive to such axial retaining member.

These and many other objects, features, and advantages of the present invention will become apparent to those skilled in the art upon reviewing the following detailed description of the preferred embodiment together with the drawings appended hereto.

BRIEF DESCRIPTION OF THE DRAWINGS

FIG. 1 is a partially cutaway side view of a half-shaft assembly, shown fragmentarily, with a constant velocity universal joint that uses an axial retaining member according to the present invention;

FIG. 2 is a perspective view of an example of an axial retaining member according to the present invention;

FIG. 3 is an enlarged cutaway view of a portion of the half-shaft assembly and axial retaining member of FIGS. 1 and 2 and illustrating the axial retaining member disengaged from the inner race thereof;

FIG. 4 is a view similar to FIG. 3 but illustrating the elements thereof and the axial retaining member is advanced partially towards engagement with the inner race;

FIG. 5 is a view similar to FIGS. 3 and 4 but illustrating the axial retaining member fully engaging the inner race of the universal joint of the half-shaft assembly;

DETAILED DESCRIPTION OF THE PREFERRED EMBODIMENT

Figure 6:
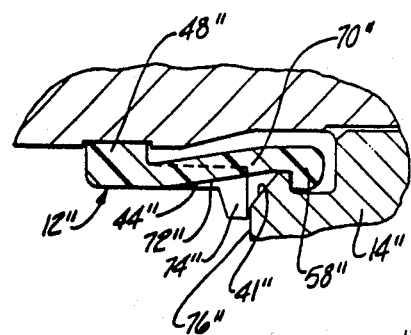
FIG. 6 is a view similar to FIG. 5 but illustrating an alternative example of structure for an axial retaining member according to the present invention.

Referring now to the drawing and, more particularly, to FIG. 1 thereof, a half-shaft assembly shown fragmentarily which incorporates a universal joint of the constant velocity type 10 is illustrated using an axial retaining member 12 according to the present invention. The universal joint 10, in general, is well known and, accordingly, the many individual components thereof are not described in detail herein. Furthermore, it will be understood by those skilled in the art that the present invention, while illustrated in relation to a universal joint assembly, has applicability for interconnecting various members. The axial retaining member of the present invention is particularly well suited for interconnecting splined shafts and splined male members, to prevent relative axial movement therebetween, but may be used for other more diverse interconnection functions, as will be apparent to those skilled in the art upon reviewing the following detailed description in conjunction with the drawings.

The universal joint 10 includes an inner race 14 having a bore 16 therein. A shaft 18 is fitted in the bore 16 and is prevented from rotating relative thereto by mating splines 20 and 22 (FIG. 3) extending, respectively, from the shaft 18 and from the inner race 14. The axial retaining member 12 of the present invention is provided to inhibit axial movement of the shaft 18 relative to the inner race 14 and further to facilitate rapid assembling of the universal joint assembly 10.

As illustrated in FIG. 3, the shaft 18 is provided with an outwardly oriented annular channel 24 having a base 30 and annular walls 26 and 28 extending from the base 30 to an outer peripheral cylindrical surface 32 of the shaft 18. The annular walls 26 and 28 form abutments for a retaining means retaining the shaft against motion relative to the inner race 14. In previous constant velocity joint assemblies, a spacer ring is fitted in a channel similar to the outwardly oriented annular channel 24 and abuts a portion of the inner race 14 to prevent movement of the shaft relative to the inner race in one direction, as indicated above in the discussion of previous retention means for half-shaft assemblies.

The shaft 18 is further provided with a reduced diameter surface portion 33, shown in FIG. 4, to provide clearance for the axial retaining member 12 in a manner to be described later.

The inner race 14 is provided with a counterbore 34 coaxial with the bore 16 and an inwardly oriented annular channel 36 extending around the counterbore 34 and opening radially into the counterbore. As indicated in FIG. 3, the inwardly oriented annular channel 36 has a base portion 38 and two annular walls 40 and 42 each extending from the base portion 38 to th channel towards the shaft 18. The inwardly oriented annular channel 36 is dissimilar from the inwardly oriented annular channel used in prior universal joint assemblies for securing the retaining ring, described above in detail in the background of the present invention, in that the inwardly oriented annular channel used for previous universal joint assemblies was provided in the bore 16, rather than in a counterbore. The counterbore 34 is provided in the inner race 14, as illustrated, so as to permit clearance for the axial retaining member 12, as will be come apparent shortly. A frustoconical sloping surface 41 is provided adjacent the counterbore 34 and slopes inwardly towards the counterbore.

The axial retaining member 12 of the present invention takes the place of both the spacer ring and the retainer ring previously used in universal joint assemblies and further facilitates the assembly of the universal joint 10. The axial retaining member 12 includes an elongated member having a main body portion 44, as best shown in FIG. 2. The main body portion 44 is formed of resilient material and has, in general, a tubular shape or a similar hollow form of revolution. The main body portion 44 has a first end 46 having a inwardly oriented radial flange 48 formed therein or adjacent thereto. The inwardly oriented radial flange 48 has a cylindrical base wall 50 and an outer and inner annular wall 52 and 54, respectively, extending generally perpendicular to the cylindrical base wall. As shown in FIG. 3, the main body portion 44 of the axial retaining member 12 may be fitted onto the shaft 18 with the inwardly oriented radial flange 48 fitted into the outwardly oriented annular channel 24. The outer annular wall 52 and the inner annular wall 54 cooperate with the annular walls 40 and 42, respectively, to maintain the inwardly oriented radial flange in a predetermined axial position relative to the shaft 18.

The axial retaining member 12, as shown in FIG. 2, is provided with a second end 56 opposite the first end 46. An outwardly oriented radial flange 58 is provided at or adjacent to the second end 56. The outwardly oriented radial flange 58 is provided with a frustoconical surface 60 having an increasing diameter in the direction extending from the second end 56 toward the first end 46 of the axial retaining member 12. The outwardly oriented radial flange 58 is further provided with an annular surface 62 extending generally perpendicular to the main body portion 44 and extending between an outer cylindrical surface 64 of the main body portion 44 of the axial retaining member 12 and the frustoconical surface 60. An intermediate cylindrical surface 66 is optionally provided between the surfaces 62 and 60.

The axial retaining member 12 is further provided with a plurality of longitudinal slots 68 extending from the second end 56 thereof partially towards the first end 46 thereof. The longitudinal slots 68 divide the second end 56 of the axial retaining member 12 into a plurality of flexible fingers 70. The longitudinal slots further divide the outwardly oriented radial flange 58 into a plurality of independent flange portions. In the example shown in FIG. 2, four longitudinal slots 68 are provided and, accordingly, four flexible fingers 70 are provided.

Assembly of the constant velocity universal joint 10 of the present invention using the axial retaining member 12 described above may now be appreciated by referring to FIGS. 3 through 5. As the shaft 18 is advanced further into the bore 16, the splines 20 and 22 become engaged.

As shown in FIG. 3, the flexible fingers 70 of the axial retaining member 12 abut the inner race 14 when the axial retaining member is assembled to the shaft 18 and the shaft 18 is advanced into the bore 16 of the inner race. Specifically, the frustoconical surface 60 of the outwardly oriented radial flange 58 at the end of the flexible fingers 70 encounters the frustoconical surface 41 of the inner race. The frustoconical surfaces 60 and 41 cooperate so as to bias the flexible fingers 70 inwardly towards the shaft, as shown in FIG. 4, until the outwardly oriented radial flange 58 clears the inwardly oriented annular channel 36. The outwardly oriented radial flange 58 then becomes trapped in the inwardly oriented annular channel 36, as illustrated in FIG. 5, due to the resilient restoring force of the flexible fingers 70.

It will be appreciated by those skilled in the art that clearance must be provided between the outer peripheral surface 32 of the shaft 18 and the inwardly oriented annular channel 36 in order to permit the passage therebetween of the second end 56 of the axial retaining member 12. As described above, the necessary clearance is provided by the counterbore 34 in the inner race 14 and by the reduced diameter portion 33 in the shaft 18. It may be appreciated, however, that either one of these clearance features may be provided without the other clearance features, using appropriate dimensioning of the components.

As shown in FIG. 3, the flexible fingers 70 are preferably proportioned such as to extend in their unstressed condition to an outer diameter larger than the inner diameter of the base portion 38 of the inwardly oriented channel 36. Thus, when the flexible fingers 70 are trapped in the inwardly oriented channel 36, as illustrated in FIG. 5, a resilient restoring of the flexible fingers 70 positively biases the fingers outwardly and contributes to a secure engagement between the axial retaining member 12 and the inner race 14.

In will further be appreciated by one skilled in the art that the resilient structure of the flexible fingers 70, as well as the clearance described above, permits selective disassembling of the universal joint 10 by providing an external force to depress the flexible fingers 70 prior to attempting to remove the shaft 18.

Figure 8:
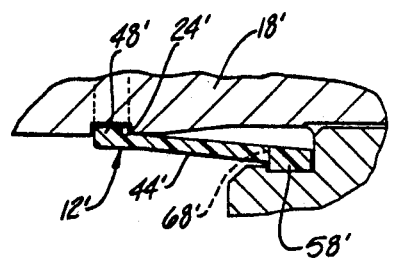
FIG. 8 is a view similar to FIG. 5 but illustrating another alternate example of structure for an axial retaining member according to the present invention.
Figure 9:
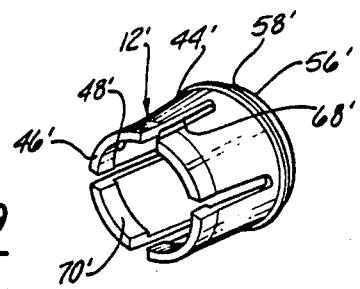
FIG. 9 is a perspective view of the alternate axial retaining member of FIG. 8.

An alternate example of structure for an axial retaining member 12' is illustrated in FIGS. 8 and 9. The axial retaining member 12' is identical in structure and in function to the axial retaining member described above except as indicated below.

The axial retaining member 12' is provided with a frustoconically shaped main body portion 44' wherein the diameter of the main body portion increases from the first end 46' towards the second end 56' thereof. The axial retaining member 12' is provided with an inwardly oriented annular flange 48' at its first end 46' and an outwardly oriented radial flange 58' extending from its second end 56' in a manner similar to the axial retaining member 12 described above. However, the longitudinal slots 68' of the axial retaining member 12' extend from the first end 46' thereof towards the second end 56' thereof, thus dividing the first end 46' into a plurality of flexible fingers 70'. It will be appreciated by those skilled in the art that the flexible fingers 70' of the axial retaining member 12' have the opposite function of the flexible fingers 70 of the previously described axial retaining member 12 in that the flexible fingers 70' secure the inwardly oriented radial flange 48' in an outwardly oriented annular channel 24' of the shaft 18'.

It will further be appreciated by those skilled in the art that an axial retaining member according to the present invention may be provided without providing any flexible fingers 70 or 70'. The resiliency of the material forming the axial retaining member would be sufficient, for many purposes, to permit the easy assembly of an axial retaining member to a shaft and an inner race. It should be noted, however, that the use of fingers are preferred since such fingers permit the easy assembly and disassembly of the shaft 18 to the inner race 14.

Figure 7:
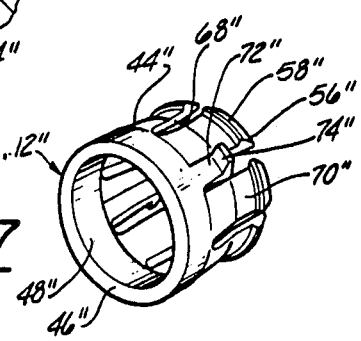
FIG. 7 is a perspective view of the axial retaining member of FIG. 6.

Referring now to FIGS. 6 and 7, yet another alternate example of structure according to the present invention is illustrated. The axial retaining member 12" illustrated in FIGS. 6 and 7 is substantially similar to the axial retaining member 12 described above except as distinguished below.

The axial retaining member 12" is provided with a main body portion 44" having an inwardly oriented radial flange 48" at its first end 46" and an outwardly oriented radial flange 58" at is second end 56" and a plurality of longitudinal slots 68" separating the second end 56" into a plurality of primary flexible fingers 79", in a manner similar to the axial retaining member 12 described above. However, the axial retaining member 12" is further provided with a plurality of secondary flexible fingers 72" which are substantially shorter than the flexible fingers 70". The secondary flexible fingers 72" are provided with a second outwardly oriented radial flange portion 74". The second outwardly oriented radial flange portion 74" abuts a radial surface 76" of the inner race 14" disposed around the frustoconical surface 41" thereof and cooperates with the flexible fingers 70" to more positively secure the axial retaining member 12" to the inner race 14".

For example, and as shown in the drawing, the axial retaining member 12" may be provided with six longitudinal slots 68", six primary flexible fingers 70", and two oppositely disposed secondary flexible fingers 72".

Figure 10:
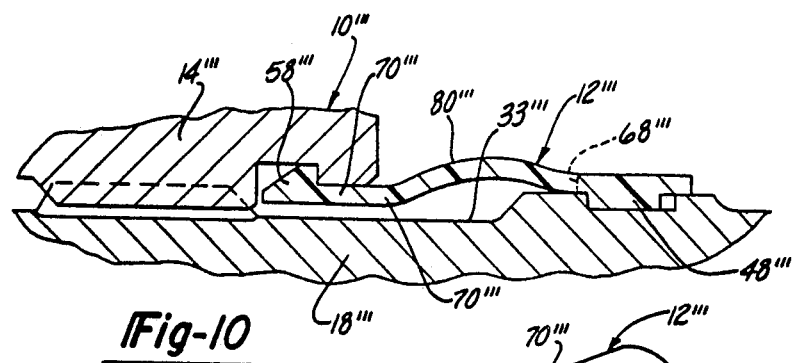
FIG. 10 is a view similar to FIG. 5 but illustrating still another alternate example of structure for an axial retaining member according to the present invention.
Figure 11:
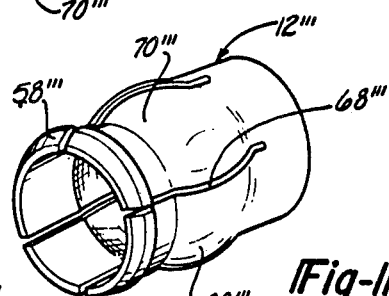
FIG. 11 is a perspective view of the alternate axial retaining member of FIG. 10.

Yet another alternate example of structure for an axial retaining member 12''' is illustrated in FIGS. 10 and 11. The axial retaining member 12''' is provided with an outwardly oriented bulge 80''' disposed between the outwardly oriented radial flange 58''' and the inwardly oriented radial flange 48'''. The plurality of longitudinal slots 68''' cut across the bulge 80'''. The bulge 80''' thereby facilitates rapid interconnection and disassembly of the shaft 18''' and the inner race 14''' since a convenient tool, not illustrated in the drawing, may be provided to temporarily encircle the bulge and deflect the flexible fingers inwardly when needed. Furthermore, the bulge 80''' permits a mechanic to rapidly disassemble the half-shaft assembly 10''' by inserting a cutting tool between the bulge 80''' and a reduced diameter portion 33''' of the shaft and cutting each of the flexible fingers 70'''.

Figure 12:
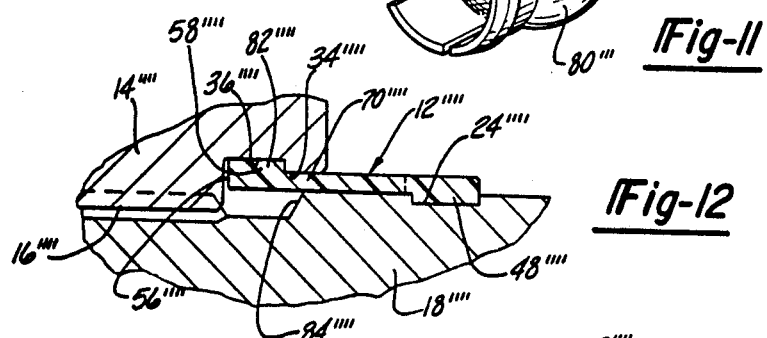
FIG. 12 is a view similar to FIG. 5 but illustrating still another alternate example from an axial retaining member according to the present invention.
Figure 13:
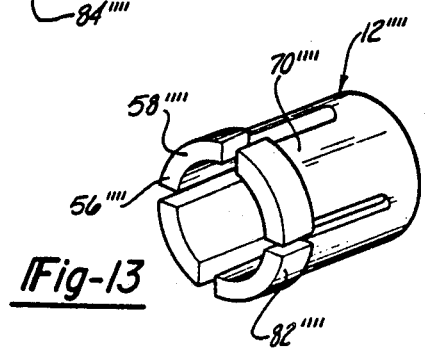
FIG. 13 is a perspective view of the alternate axial retaining member of FIG. 12.

Still yet another alternate example of structure for an axial retaining member 12'''' is illustrated in FIGS. 12 and 13. As illustrated, the axial retaining member 12'''' is approximately cylindrical in shape and is provided with an inwardly oriented radial flange 48'''' fitted into an outwardly oriented annular channel 24'''' on a shaft 18''''. A plurality of flexible fingers 70'''' extend from the portion of the axial retaining member 12'''' adjacent the inwardly oriented radial flange 48'''' and are each provided with partial flange portions 82'''' extending therefrom.

The shaft 18'''' is provided with a chamfer 84'''' adjacent and opposite the outwardly oriented flange portions 82''''. The inner race 14'''' is provided with a counterbore 34'''' and an inwardly oriented annular channel 36''''.

For assembly, the axial retaining member 12'''' is first assembled to the shaft 18''''. The shaft 18'''' is then forced into a bore 16'''' in the inner race 14''''. The ends 56'''' of the flexible fingers 70'''' deflect resiliently into the chamfer 84'''' and subsequently engage the inwardly oriented annular channel 36''''.

Figure 14:
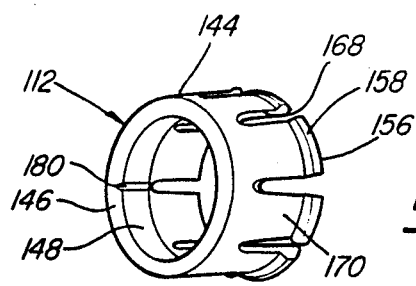
FIG. 14 is a perspective view of the preferred embodiment of an axial retaining member according to the present invention.
Figure 15:
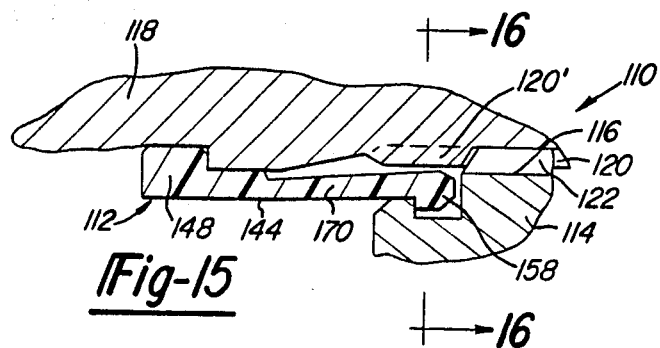
FIG. 15 is a view similar to FIGS. 3, 4, 5, 6, 8, 10 and 12 illustrating the axial retaining member of FIG. 14.
Figure 16:
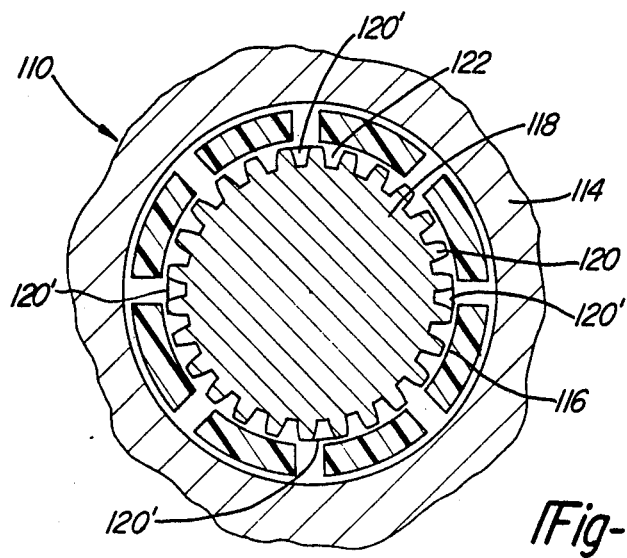
FIG. 16 is a sectional view taken on line 16-16 of FIG. 15.

FIGS. 14 through 16 illustrate yet another embodiment of the present invention, the embodiment that is now the preferred embodiment. The embodiment of FIGS. 14 through 16 utilizes an axial retaining member 112, which is substantially similar to the axial retaining member 12 described above, except as distinguished below.

The axial retaining member 112 is provided with a main body portion 144 having an inwardly oriented radial flange 148 at its first end 146 and an outwardly oriented radial flange 158 at its second end 156 and a plurality of longitudinal slots 168 separating the second end 156 into a plurality of flexible fingers 170, in a manner similar to the axial retaining member 12 described above. The first end 146 of the axial retaining member 112 is also provided with an area of substantially reduced thickness that extends along a longitudinally extending line 180, the longitudinally extending line 180 beginning at the first end 146 of the axial retaining member 112 and terminating at one of the plurality of longitudinal slots 168.

The reduced thickness of the axial retaining member 112 along the longitudinally extending line 180 gives the axial retaining member an area of weakness which permits the axial retaining member to controllably separate along the longitudinally extending line 180 into a double-ended or C-shaped configuration when the axial retaining member is assembled to the shaft 118 of a universal joint 110 by inserting the end of the shaft 118 into the axial retaining member 112, after the axial retaining member 112 has been assembled into the bore 116 of the inner race 114 of the universal joint 110. Thus, the axial retaining member 112 can be applied to the shaft 118 without requiring significant elastic deformation of the axial retaining member 112, thus, permitting the use of a harder, more dimensionally stable and more impact-resistant thermoplastic material in the manufacture of the axial retaining member 112 than would be the case with respect to an axial retaining member that was not designed to separate into such a C-shaped configuration during assembly. The use of a hard, dimensionally stable, impact-resistant thermoplastic material in the manufacture of the axial retaining member 112 is advantageous because it enhances the ability of the axial retaining member to resist failure as a result of deformation under loads of the type that can be encountered during the assembly of the universal joint 110 in an automotive assembly plant, for example, or during the operating life of such a universal joint 110. A glass-impregnated nylon (polyamide) thermoplastic material has been found to be well-suited for use in the manufacture of axial retaining members by injection molding.

The axial retaining member 112, by virtue of its resistance to deformation under load, cannot be removed from the universal joint 110 without physical destruction of the axial retaining member. Thus, the shaft 118 of the universal joint 110 need not incorporate a reduced diameter surface portion corresponding to the reduced diameter surface portion 33 of the shaft 18 of the half-shaft assembly 10 of FIGS. 1 through 5, to provide a clearance for the removal of the axial retaining member 112 from the shaft 118.

In the assembly of the universal joint 110 of the embodiment of FIGS. 15 and 16, the shaft 118, which has outwardly extending splines 120 around the end portion thereof, engages splines 122 extending inwardly from the bore 116 of the inner race 114 of the universal joint 110. The advancement of the shaft 118 into the inner race 114 is limited by blocking the spaces between certain pairs of the splines 120 on the shaft 118, for example, at four locations located at 90° intervals around the shaft, such locations being identified by reference numeral 120' in the drawing. Thus, if the universal joint 110 encounters any substantial normal or unexpected end loads during assembly or during its operating life, such end loads will be absorbed by contact between the splines 122 of the bore 116 and the blocked portions of the splines 120 of the shaft 118, which elements are made of steel or other strong metallic material, and such substantial end loads will, therefore, not be imposed on the axial retaining member 112 which is not as well suited to carry such end loads because of it's construction from a thermoplastic material. This will further insure that the axial retaining member 112 will not fail during assembly or during its operating life.

It will be appreciated by those skilled in the art that the above description is offered by way of example and not by way of limitation. Accordingly, it is contemplated that various axial retaining members may be constructed utilizing some of the features of each of the axial retaining members 12, 12', 12", 12''', and 12'''' without using all of the features. For example, an axial retaining member may be constructed similar to the axial retaining member 12'''' of FIGS. 12 and 13 having a frustoconical shape such that the flexible fingers 70'''' would be kept in a prestressed condition when engaged in the inwardly oriented annular channel 36''''. When such an axial retaining member is used, a tool, a retaining clip, or other retaining means may be used to temporarily deflect the flexible fingers 70'''' to temporarily secure the flexible fingers 70'''' against the shaft 18'''' during assembly.

The above description includes the best mode contemplated by the inventor at the time of filing for carrying out the present invention. It will be appreciated by those skilled in the art that many variations and modifications may be made to the present invention with departing from the spirit of the present invention. Such modifications and variations are included within the intended scope of the claims appended hereto.

What is claimed as novel is as follows:

1. In combination with a constant velocity universal joint of the type having an inner joint member having a splined bore therein, a shaft having a plurality of splines thereon, said splines of said shaft being mounted in said spline bore, the improvement comprising:
   a counterbore adjacent said splined bore in said inner joint member;
   a radially inwardly oriented annular channel located in said shaft, said radially inwardly oriented annular channel being spaced from said plurality of splines on said shaft;
   an annular channel in said inner joint member, said annular channel being oriented radially outwardly from said counterbore of said inner joint member;
   an annular hollow unitary axial retaining member having a predetermined radial thickness, a longitudinal axis, and further having a first end and a second end;
   a central passageway through said hollow unitary axial retaining member along said longitudinal axis;
   first radial flange means extending radially inwardly from said hollow unitary axial retaining member and disposed adjacent said first end, said first end further being fitted onto said shaft with said shaft radial flange means disposed in said radially inwardly oriented channel of said shaft;
   second radial flange means integral with and extending radially outwardly from said hollow unitary axial retaining member and disposed adjacent said second end thereof; said second end further being mounted in said splined bore of said inner joint member with said second radial flange means disposed in said annular channel in said inner joint member; and
   a narrow portion of reduced predetermined radial thickness in said hollow unitary axial retaining member along a generally longitudinally extending line that partially extends from said first end towards said second end of said hollow unitary axial retaining member to permit controlled separation of said hollow unitary axial retaining member along said generally longitudinal extending line.

2. The combination as claimed in claim 1 further comprising:
   a plurality of longitudinal slots formed in said hollow unitary axial retaining member, said plurality of longitudinal slots partially extending from said second end towards said first end, such as to separate said second end into a plurality of longitudinally extending flexible fingers, said reduced predetermined radial thickness extending along said generally longitudinally extending line from said first end of said to one of said plurality of longitudinal slots.

3. The combination as claimed in claim 2 wherein said flexible fingers are in a prestressed condition in use.

4. The combination as claimed in claim 1 wherein said hollow unitary axial retaining member and said first and second axial flange means are molded as a single piece of plastic.

5. The combination as claimed in claim 1 wherein said hollow unitary axial retaining member is approximately cylindrical in shape.

6. A unitary axial retaining member for interconnecting a first member with a second member wherein said first member has a splined shaft having an annular channel and wherein said second member has a body having a splined bore therein for insertion of said shaft, a counterbore adjacent said bore, and a radially oriented annular channel extending radially outwardly from said counterbore, said unitary axial retaining member being formed of a resilient material and further comprising:
   a hollow main body having a predetermined thickness, a longitudinal axis, a first end, and a second end, said hollow main body being adaptable to be fitted to said shaft with said second end disposed adjacent said second member;
   an inwardly oriented radial flange extending from said first end of said hollow main body and engageable with said annular channel in said shaft;
   an outwardly oriented radial flange extending from said second end of said hollow main body and engageable with said radially oriented annular channel of said second member;
   a plurality of longitudinal slots extending from said second end of said hollow main body towards said first end of said hollow main body to separate said second end of said hollow main body into a plurality of longitudinally extending flexible fingers; and a generally longitudinally extending reduced predetermined thickness portion extending from said first end of said hollow main body to one of said plurality of longitudinal axis, said reduced predetermined thickness portion being along a generally longitudinally extending line to permit controlled separation of said hollow main body along said generally longitudinally extending reduced predetermined thickness portion.

7. The unitary axial retaining member of claim 6 wherein said outwardly oriented radial flange further comprises an annular shoulder extending from said hollow main body and forming an internal angle therewith of not more than ninety degrees relative to said hollow main body.

8. The unitary axial retaining member of claim 6 wherein said longitudinally extending flexible fingers are in a prestressed condition when said unitary axial retaining member is interconnected with said first and second members.

9. The unitary axial retaining member of claim 6 wherein said outwardly oriented radial flange is frustoconically shaped and increases in diameter from said second end towards said first end of said hollow main body.

10. The unitary axial retaining member of claim 6 wherein said splined shaft and said splined bore have mutually complementary splines such that said shaft and said bore are prevented from rotating relative to each other.

11. The unitary axial retaining member of claim 10 wherein at least one of said mutually complementary splines on said shaft is blocked to permit said unitary axial retaining member to withstand substantial end loads without the imposition of substantial end loads on said hollow main body.

12. A locking arrangement comprising in combination:
a female member;
a splined bore extending through said female member;
a male member comprising a splined shaft, said splined shaft being mounted in said splined bore such that said female member and male member are prevented from rotating relative to each other;
a counterbore in said female member coaxial with said bore and disposed around a portion of said shaft;
a first radially oriented annular channel in said female member extending radially outwardly from said counterbore;
a second radially oriented annular channel in a portion of said shaft remote from said bore;
a hollow unitary axial retaining member formed of a dimensionally stable, impact-resistant thermoplastic material, said hollow unitary axial retaining member having a first end, second end, and a longitudinally extending main body portion therebetween, said longitudinally extending main body portion having a predetermined radial thickness, said hollow unitary axial retaining member further having a predetermined reduced radial thickness portion along a generally longitudinally extending line extending from said first end of said hollow unitary axial retaining member to said second end of said hollow unitary axial retaining member;
an inwardly oriented radial flange extending from said first end of said hollow unitary axial retaining member and engaging said second radially oriented annular channel; and
an outwardly oriented radial flange extending from said second end of said hollow unitary axial retaining member and engaging said first radially oriented annular channel.

13. The locking arrangement of claim 12 wherein said thermoplastic material is a glass-impregnated polyamide material.

14. The locking arrangement of claim 12 wherein said female member comprises an inner face of a universal joint.

15. The locking arrangement of claim 14 further comprising:
a plurality of longitudinal slots formed in said main body portion of said hollow unitary axial retaining member and extending from said second ends toward said first end such as to separate said second end into a plurality of longitudinally extending flexible fingers, said generally longitudinally extending predetermined reduced radial thickness portion extending from said first end of said hollow unitary axial retaining member to one of said plurality of longitudinal slots.

16. The locking arrangement of claim 12 wherein at least one of the cooperating splines on said shaft is blocked to permit said locking arrangement to withstand substantial end loads without the imposition of substantial end loads on said hollow unitary axial retaining member.

17. The locking arrangement of claim 16 wherein in plurality of the cooperating splines on said shaft are blocked.

18. A method of rotatably interconnecting a partially splined shaft member with a female body member, said female body member having a splined bore for insertion of said partially splined shaft, said comprising the steps of:
mounting at least one end of a hollow unitary axial retaining member to the peripheral surface of said partially splined shaft member, said mounting of said at least one end separating said hollow unitary axial retaining member to change such hollow unitary axial retaining member to a double-ended hollow unitary axial retaining member;
rotatably interconnecting said at least one end of said hollow unitary axial retaining member with said partially splined shaft member; and
rotatably interconnecting said female body member with the end of said hollow unitary axial retaining member opposite said at least one end.

19. The method of claim 18 wherein said step of rotatably interconnecting said hollow unitary axial retaining member with said partially splined shaft member comprises inserting an inwardly oriented flange extending from said hollow unitary axial retaining member into a suitable annular channel in said partially splined shaft member.

20. The method of claim 18 wherein said step of rotatably interconnecting said hollow unitary axial retaining member with said female body member comprises inserting an outwardly oriented flange extending from said hollow unitary axial retaining member into a suitable annular slot in said splined bore of said female body member.

21. The method of claim 18 wherein said hollow unitary axial retaining member has a plurality of longitudinal slots formed in said end opposite said at least one end, said longitudinal slots thereby separating said end opposite said at least one end into a plurality of longitudinally extending flexible fingers facilitating said one of said rotatably interconnecting steps.

22. A method of rotatably interconnecting a male partially splined shaft having an annular channel with a female member having a splined bore therein for insertion of said male partially splined shaft, said female member further having a counterbore adjacent said splined bore with a radially oriented annular channel extending radially outwardly from said counterbore, said interconnecting method comprising the steps of:

mounting one end of a hollow unitary axial retaining member into said radially oriented annular channel of said female member, said hollow unitary axial retaining member having flexible fingers on said one end such that said flexible fingers are depressed radially inwardly to mount said hollow unitary axial retaining member to said female member and move radially outwardly to engage said radially oriented annular channel;

inserting one end of said partially splined shaft into an end opposite said one end of said hollow unitary axial retaining member;

advancing said one end of said partially splined shaft towards said splined bore of said female member and engaging said splined male member with said splined female member; said advancing and engaging step separating said hollow unitary axial retaining member along a generally axially extending reduced radial thickness portion aligned with one of said flexible fingers on said one end of said hollow unitary axial retaining member; and advancing said male partially splined shaft along said mutually engageable splines of said male and female member until said end opposite said one end of said hollow unitary axial retaining member engages said radially oriented annular channel of said splined shaft to form an interconnecting male shaft and female member.

23. The method as claimed in claim 22 wherein said step of mounting one end of said hollow unitary axial retaining member into said radially oriented annular channel comprises:

inserting an outwardly oriented annular flange extending from said hollow unitary axial retaining member into said radially oriented annular channel in said counterbore of said female member.

24. The method as claimed in claim 22 wherein said step of advancing said shaft along said mutually engageable splines of said male and female members comprises:

separating said hollow unitary axial retaining member along a reduced predetermined radial thickness portion located along a generally longitudinally extending line from said end opposite said one end to one of said flexible fingers to change said hollow unitary axial retaining member to a double-ended hollow unitary axial retaining member; and inserting an inwardly oriented annular flange extending from said hollow unitary axial retaining member into said annular channel of said splined shaft.

25. A method of rotatably interconnecting a male shaft having a plurality of splines thereon and an annular channel therein with a female member having a splined bore therein, a counterbore adjacent said bore and a radially oriented annular channel extending radially outwardly from said counterbore, said method comprising the steps of:

inserting one end of an annular hollow unitary axial retaining member into said splined bore of said female member; said one end of said annular hollow unitary axial retaining member having a plurality of resilient longitudinally extending flexible fingers, defining a plurality of slots therebetween and an outwardly oriented radial flange, the other end of said annular hollow unitary axial retaining member having an inwardly oriented radial flange and a generally longitudinally extending reduced predetermined thickness portion extending longitudinally from said other end of said annular hollow unitary axial retaining member to one of said plurality of slots;

advancing said annular hollow unitary axial retaining member into said splined bore of said female member until said outwardly oriented flange of said annular hollow unitary axial retaining member moves into said radially oriented annular channel of said female member to lock said annular hollow unitary axial retaining member into said splined bore of said female member;

inserting said male shaft into said other end of said annular hollow unitary axial retaining member, said inserting of said male shaft into said other end of said annular hollow unitary axial retaining member separating said annular hollow unitary axial retaining member along said longitudinally extending reduced predetermined thickness portion to change said annular hollow unitary axial retaining member to a double-ended annular hollow unitary axial retaining member; and advancing said male shaft along said annular hollow unitary axial retaining member and along said splined bore of said female member until said inwardly oriented radial flange moves into said annular channel of said male shaft to lock said male shaft to said annular hollow unitary axial retaining member and said female member.

* * * * *

UNITED STATES PATENT AND TRADEMARK OFFICE
CERTIFICATE OF CORRECTION

PATENT NO. : 4,813,808
DATED     : March 21, 1989
INVENTOR(S) : Glenn F. Gehrke

It is certified that error appears in the above-identified patent and that said Letters Patent is hereby corrected as shown below:

Column 1, line 52, delete "chamber" and insert --- chamfer ---.

Column 1, line 56, delete "chamber" and insert --- chamfer ---.

Column 2, line 32, after "sliding" insert --- of ---.

Column 4, line 1, delete "interconnect in" and insert --- interconnection ---.

Column 5, line 65, delete "from" and insert --- of structure for ---.

Column 6, line 13, after "joint" insert --- 10 ---.

Column 6, line 14, delete "10".

Column 6, line 62, delete "to th" and insert --- of the ---.

UNITED STATES PATENT AND TRADEMARK OFFICE
CERTIFICATE OF CORRECTION

PATENT NO. : 4,813,808

DATED : March 21, 1989

INVENTOR(S) : Glenn F. Gehrke

It is certified that error appears in the above-identified patent and that said Letters Patent is hereby corrected as shown below:

Column 7, line 18, delete "a" and insert ---- an ----.

Column 7, line 29, delete "40 and 42" and insert ---- 28 and 26 ----.

Column 7, line 38, delete "toward" and insert ---- towards ----.

Column 8, line 20, delete "features" and insert ---- feature ----.

Column 8, line 26, before "channel" insert ---- annular ----.

Column 8, line 27, after "oriented" insert ---- annular ----.

Column 11, line 17, delete "it's" and insert ---- its ----.

Column 11, line 19, delete "insure" and insert ---- ensure ----.

Column 11, line 42, delete "with" and insert ---- without ----.

In the Claims

Column 12, line 20, delete "longitudinal" and insert ---- longitudinally ----.

UNITED STATES PATENT AND TRADEMARK OFFICE
CERTIFICATE OF CORRECTION

PATENT NO. : 4,813,808

DATED : March 21, 1989

INVENTOR(S) : Glenn F. Gehrke

It is certified that error appears in the above-identified patent and that said Letters Patent is hereby corrected as shown below:

Column 12, line 31, after "said" (first occurrence) insert ---- hollow unitary axial retaining member ----.

Column 12, line 37, delete "axial" and insert ---- radial ----.

Column 13, line 4, delete "axis" and insert ---- slots ----.

Column 14, line 11, delete "face" and insert ---- race ----.

Column 14, line 26, delete "at least one of the cooperating splines on said shaft is" and insert ---- said splined shaft has a spline ----.

Column 14, line 31, delete "in" and insert "a".

Column 15, line 25, after said (second occurrence) insert ---- male ----.

Column 15, line 27, after "said (first occurrence) insert ---- male partially ----, same line, delete "male member" and insert ---- shaft ----.

UNITED STATES PATENT AND TRADEMARK OFFICE
CERTIFICATE OF CORRECTION

PATENT NO. : 4,813,808

DATED : March 21, 1989

INVENTOR(S) : Glenn F. Gehrke

It is certified that error appears in the above-identified patent and that said Letters Patent is hereby corrected as shown below:

Column 15, line 28, after "splined" insert ---- bore of said ----.

Column 15, line 35, delete " mutually engageable" and insert ---- partially splined shaft ---- after "male".

Column 15, line 38, after "said" (second occurrence) insert ---- male partially ----.

Column 15, line 45, delete "annular" and insert ---- radial ----.

Column 15, line 50, after "said" (first occurrence) insert ---- male partially splined ----, same line, delete " mutually engage-".

Column 15, line 51, delete "able", same line, after "male" insert ---- partially splined shaft ----, same line, after "and" insert ---- said ----, same line, delete "members" and insert ---- member ----.

UNITED STATES PATENT AND TRADEMARK OFFICE
CERTIFICATE OF CORRECTION

PATENT NO. : 4,813,808

DATED : March 21, 1989

INVENTOR(S) : Glenn F. Gehrke

It is certified that error appears in the above-identified patent and that said Letters Patent is hereby corrected as shown below:

Column 16, line 5, delete "annular" and insert ---- radial ----.

Column 16, line 7, after "said" (second occurrence) insert ---- male partially ----.

Column 16, line 31, after "oriented" insert ---- radial ----.

Signed and Sealed this

Tenth Day of April, 1990

Attest:

HARRY F. MANBECK, JR.

*Attesting Officer*    *Commissioner of Patents and Trademarks*